(12) United States Patent
Briggs (10) Patent No.: US 8,429,802 B2
(45) Date of Patent: Apr. 30, 2013

(54) KEYLESS ARBOR DEVICE AND METHOD OF USING

(75) Inventor: Edward Briggs, Goose Lake, IA (US)

(73) Assignee: C. & E. Fein GmbH (DE)

( * ) Notice: Subject to any disclaimer, the term of this patent is extended or adjusted under 35 U.S.C. 154(b) by 1130 days.

(21) Appl. No.: 12/030,020

(22) Filed: Feb. 12, 2008

(65) Prior Publication Data

US 2009/0200759 A1 Aug. 13, 2009

(51) Int. Cl.
*B23B 31/103* (2006.01)

(52) U.S. Cl.
USPC ............... 29/428; 279/35; 279/77; 279/81; 279/107; 279/140; 279/157; 408/239 R (58) Field of Classification Search ........... 279/35, 279/56, 69, 70, 77, 78, 81, 107, 140, 151, 279/157; 408/239 R; *B23B 31/103*
See application file for complete search history.

(56) References Cited

U.S. PATENT DOCUMENTS

| | | | | |
|---|---|---|---|---|
| 54,760 | A * | 5/1866 | Olmsted | 279/69 |
| 857,947 | A * | 6/1907 | Leland | 279/56 |
| 917,033 | A * | 4/1909 | Fegley | 279/56 |
| 936,644 | A * | 10/1909 | Leland | 279/56 |
| 992,572 | A * | 5/1911 | McLaughlin | 279/56 |
| 1,063,702 | A * | 6/1913 | Leland | 279/56 |
| 1,184,758 | A * | 5/1916 | Leland | 279/56 |
| 1,270,443 | A * | 6/1918 | Rusby | 279/69 |
| 1,433,527 | A * | 10/1922 | Browand | 279/81 |
| 1,488,001 | A * | 3/1924 | Clare | 279/69 |
| 1,820,703 | A * | 8/1931 | Hungerford | 285/280 |
| 2,670,215 | A * | 2/1954 | Fishwick | 279/38 |
| 3,767,217 | A * | 10/1973 | Jensen | 279/56 |
| 4,127,224 | A * | 11/1978 | Newman, Sr. | 242/615.3 |
| 4,260,169 | A | 4/1981 | Hall | |
| 4,366,732 | A * | 1/1983 | Schliep | 81/128 |
| 4,395,170 | A | 7/1983 | Clarey | |
| 4,911,040 | A * | 3/1990 | Kim | 81/128 |
| 5,125,673 | A | 6/1992 | Huff et al. | |
| 5,218,890 | A | 6/1993 | Christ, Jr. | |
| 5,354,075 | A | 10/1994 | Marik et al. | |
| 5,427,482 | A | 6/1995 | Asano et al. | |
| 5,429,457 | A | 7/1995 | Asano et al. | |
| 5,447,397 | A | 9/1995 | Asano | |
| 5,460,388 | A * | 10/1995 | Lewis et al. | 279/42 |
| 5,579,829 | A | 12/1996 | Comeau et al. | |
| 5,755,448 | A | 5/1998 | Kanaan et al. | |
| 5,984,595 | A * | 11/1999 | Mizoguchi | 408/57 |
| 6,139,228 | A | 10/2000 | Longo | |
| 6,280,123 | B1 * | 8/2001 | Gill | 408/76 |
| 6,533,291 | B2 | 3/2003 | Huggins et al. | |
| 6,834,864 | B2 | 12/2004 | Girardeau | |

* cited by examiner

*Primary Examiner* — Eric A Gates
(74) *Attorney, Agent, or Firm* — Jason R. Sytsma; Shuttleworth & Ingersoll, PLC (57) ABSTRACT

A keyless arbor device for securing a tool, such as a drill bit, to a driver. At least one drive key is pivotally combined with the arbor. A threaded member and an outer sleeve are combined with an arbor. Rotation of the outer sleeve in a first direction causes the threaded member to move in a first direction and rotation of the outer sleeve in a second direction causes the threaded member to move in a second direction. The drive key is positioned so that as the threaded member is moved in its second direction, the threaded member makes contact with the drive key which forces the drive key to pivot from its first position to its second position thereby engaging the shank of the tool to secure the tool with the arbor.

33 Claims, 7 Drawing Sheets

KEYLESS ARBOR DEVICE AND METHOD OF USING

BACKGROUND OF THE INVENTION

The present invention relates generally to an apparatus for removably combining a tool such as an annular cutter with a hand, electric, or pneumatic power driver.

Electric and pneumatic tool drivers such as drills are well known. Although drill bits are the most common tools used with such drivers, other tools used with power drivers include nut drivers, burrs, mounted grinding stones, and other cutting or abrading tools. Since the tool shanks (shafts) vary in diameter or have a polygonal cross-section, tool drivers usually have an adjustable chuck for receiving the variously sized tools. The chuck may be attached to the driver spindle by a threaded or tapered bore. Examples of these types of chucks are disclosed in U.S. Pat. Nos. 6,533,291, 5,125,673, and 5,354,075.

Typically, a chuck includes three gripping members disposed approximately 120 degrees apart from each other. The members are configured so that their center lines meet at a point along the chuck's central axis. The three gripping members are movable radially in a linear motion to grip the cylindrical or polygonal tool shank displaced approximately along the chuck's center axis. The chuck is attached to the spindle of a driver and is configured so that rotation of the chuck's body in one direction forces the gripping members into a gripping relationship with the tool shank, while rotation in the opposite direction releases the gripping relationship. The chuck may be operated by a chuck key or the sleeve may be rotated by hand in a keyless configuration.

One problem with traditional chucks and other keyless arbors provided on tools such as magnetic base drills is that the linear movement of the gripping members requires the chuck or keyless arbor drive mechanism to have a large diameter relative to the arbor in order to accommodate the travel distance of the gripping members. Large diameter chucks are unfavorable because they reduce the vertical travel capacity of the power drivers or increase the overall height of the power driver when used in applications such as magnetic base drills. Another problem with existing chucks is that they grip only on the outer diameter of the shank, whereas many cutting tools such as annular cutters are driven by flats provided on the cutting tool shank. Generally the depth of the flats provided on the cutting tool shank will vary from cutter to cutter and from manufacturer to manufacturer. In many existing keyless arbor designs, if the shank of the cutting tool is not produced in an exact manner, the gripping or driving members of the arbor will not accurately engage because the locked position of the drive mechanism has a fixed (non-variable) position thereby causing the cutting tool to be loose in the arbor or not allowing the drive mechanism to realize its fully locked position. This has led to the production of many specialized tools for use only in specific brands of drivers.

SUMMARY OF THE INVENTION

The present invention is an arbor device adapted to secure a tool, such as an annular cutter, to a power driver, such as a magnetic base drill. The device comprises an arbor having a first end and a second end wherein the arbor is combined with the power driver at its first end. The first end may also be configured to fit into a standard machine tool holder such as a drill press, a milling machine, or a CNC machine. Further, the first end could comprise the driven portion of an output shaft of a driving motor. The second end of the arbor has an opening that is adapted to receive and combine with the tool as is further described below.

The device generally comprises at least one drive key pivotally combined with the arbor. The drive key has a first position wherein the drive key is retracted and a second position wherein the drive key is extended. In one embodiment, an elastic or spring member biases the drive key in its first position. The device also comprises a threaded member in threaded engagement with an outer sleeve. Rotation of the outer sleeve in a first direction causes the threaded member to move in a first direction toward a first position and rotation of the outer sleeve in a second direction causes the threaded member to move in a second direction toward a second position. The drive key is positioned so that as the threaded member is moved in its second direction (from its first position to its second position), the threaded member makes contact with the drive key which forces the drive key to pivot from its first position to its second position.

To combine the tool with the arbor, the shaft of the tool is inserted into the opening in the arbor second end such that the flat on the cutter shank is aligned with the drive key. The outer sleeve is rotated so as to move the threaded member from its first position to its second position. As described above, this causes the drive key to pivot from its first position to its second position. In the drive key's second position, the drive key is pivoted inward so that it contacts the flat on the shaft of the tool. The outer sleeve is rotated until the drive key is engaged with the flat on the shaft of the tool to securely fasten the tool to the arbor.

To release the tool from the arbor, the outer sleeve is rotated in its second direction which causes the threaded member to move in its second direction away from the drive key. With the threaded member no longer in contact with the drive key, the drive key is pivoted away from the shaft of the tool by the elastic or spring member, which, as described above, biases the drive key in its first position.

The device is advantageous over the prior art because the pivoting motion of the drive key allows the drive key to secure the tool in the arbor without requiring the device to have a large diameter. In the preferred embodiment, the diameter of the components used to lock the tool in place is no greater than the diameter of the rest of the arbor thereby allowing the device to have an unobstructed vertical travel capacity when combined with power drivers such as magnetic base drills. Further, the device can easily be modified to add or remove drive keys from the arbor so the device can be used with tools having different numbers of drive flats. Still further, the device is infinitely adjustable so that it can be used with tools having drive flats machined to various depths by simply rotating the outer sleeve a little more or a little less depending on the depth of the drive flat.

DESCRIPTION OF THE PREFERRED EMBODIMENT OF THE INVENTION

Figure 1:
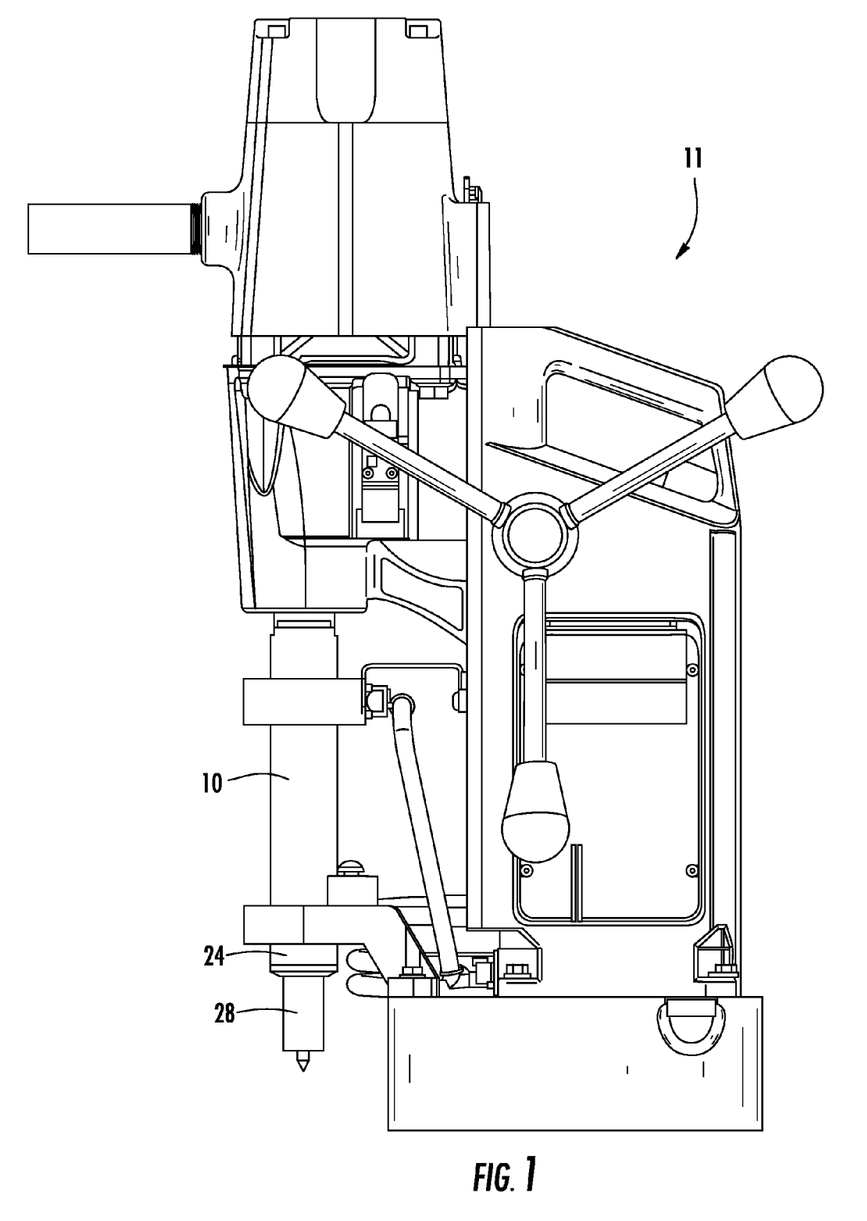
FIG. 1 is a perspective view of an embodiment of the keyless arbor device of the present invention combined with a magnetic base drill.

The present invention is a keyless arbor device adapted to secure a tool 28, such as an annular cutter, to a power driver 11, such as a magnetic base drill. As seen in FIG. 1, the device comprises an arbor 10 having a first end and a second end wherein the arbor 10 is combined with the power driver 11 at its first end. The second end of the arbor 10 has an opening that is adapted to receive and combine with the tool 28 as is further described below.

Figure 2:
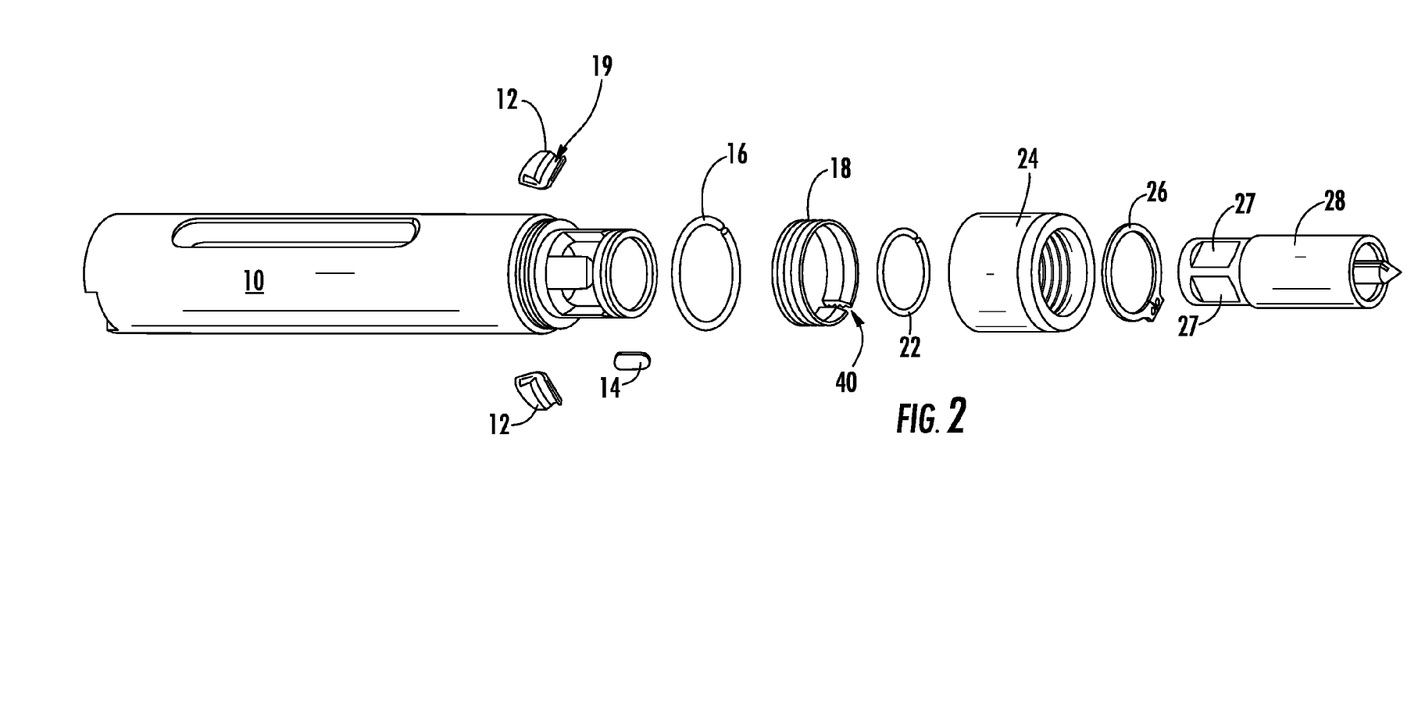
FIG. 2 is an exploded view of an embodiment of the keyless arbor device of the present invention.
Figure 3A:
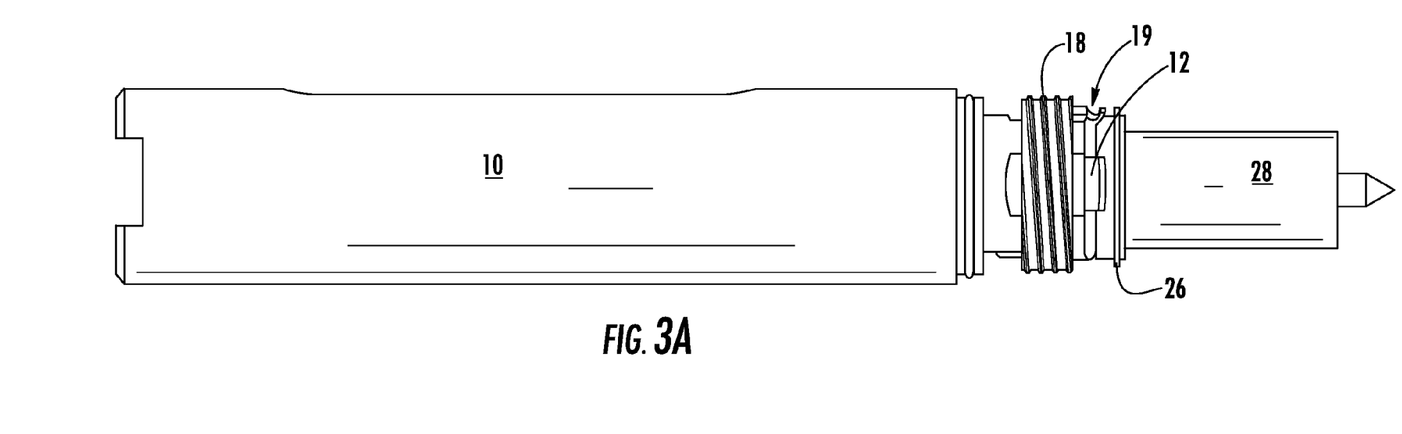
FIG. 3a is a side view showing an embodiment of the device in the locked position wherein the outer sleeve has been removed for clarity.
Figure 3B:
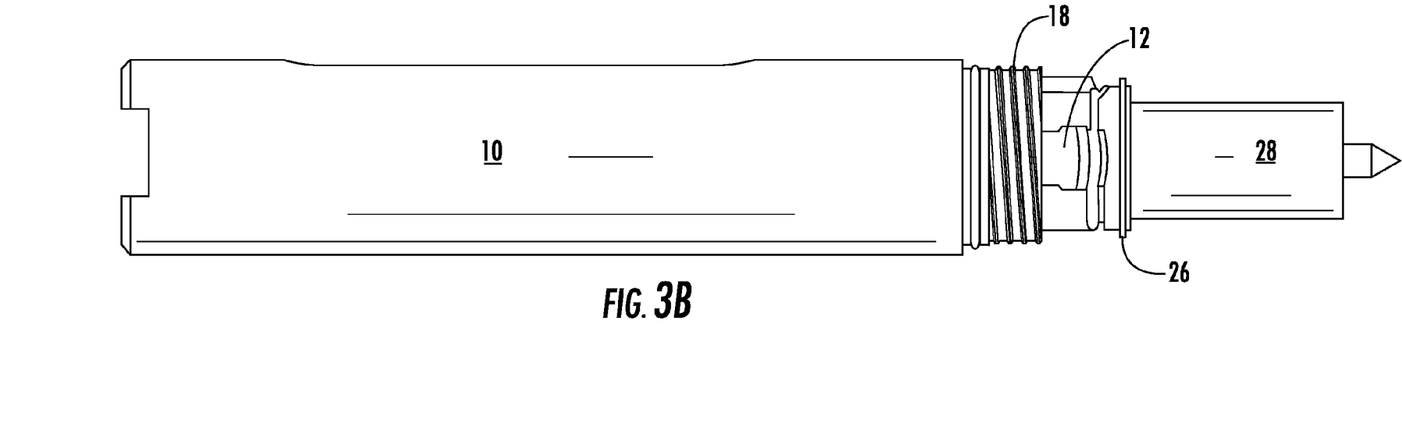
FIG. 3b is a side view of an embodiment of the device in the release position wherein the outer sleeve has been removed for clarity.
Figure 5A:
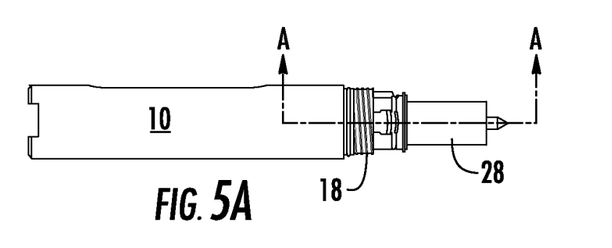
FIG. 5a is a side view of an embodiment of the device showing the device in the release position.
Figure 5B:
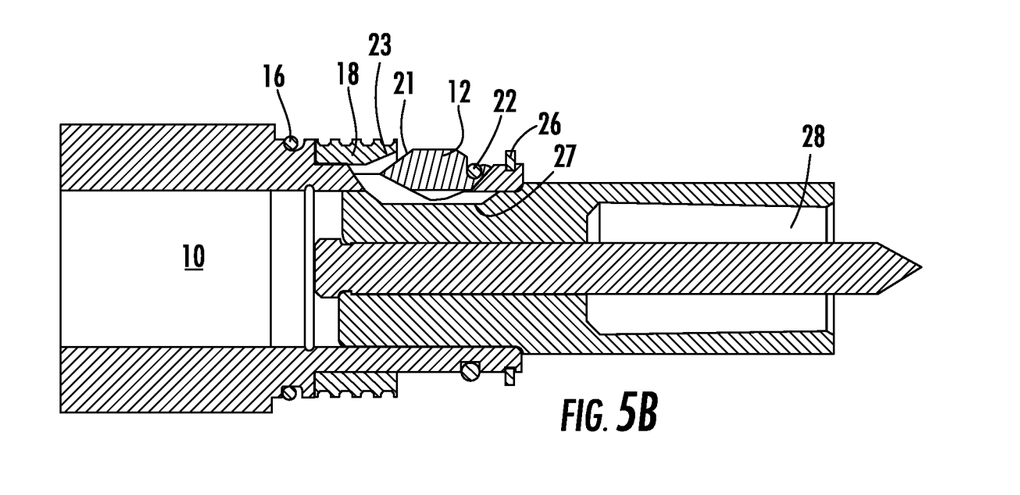
FIG. 5b is a cross-sectional view taken on the line A-A of FIG. 5a and showing the device in the release position.
Figure 6A:
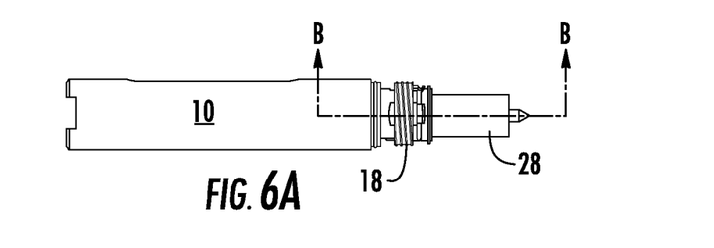
FIG. 6a is a side view of an embodiment of the device showing the device in the locked position.
Figure 6B:
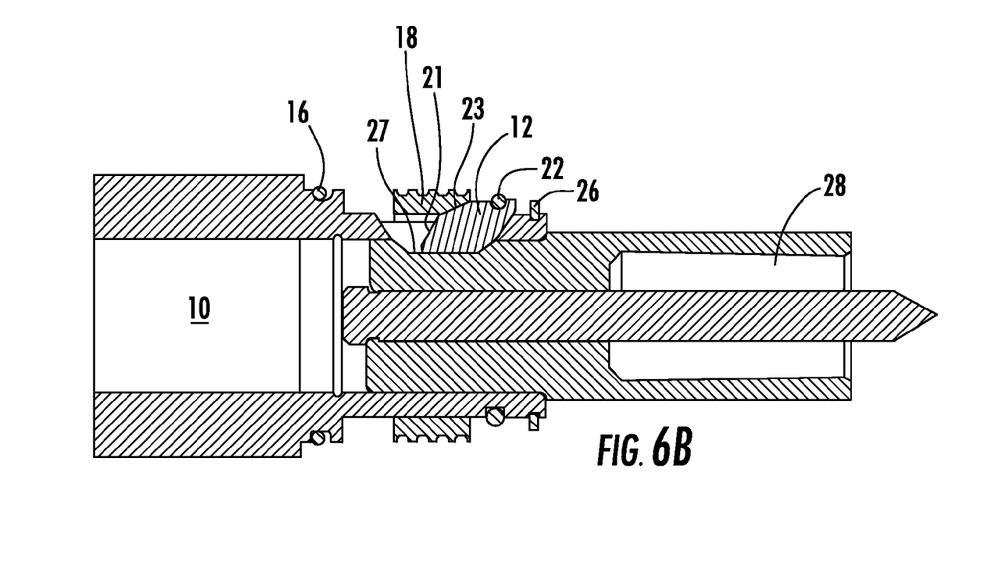
FIG. 6b is a cross-sectional view taken on the line B-B of FIG. 6a and showing the device in the locked position.

As seen in FIG. 2, the device comprises a threaded member 18 and an outer sleeve 24 combined with the second end of the arbor 10. The outer sleeve 24 has internal threads that mate with the threads on the outer surface of the threaded member 18 so that rotation of the outer sleeve 24 in a first direction causes the threaded member 18 to move in a first direction toward a first position and rotation of the outer sleeve 24 in a second direction causes the threaded member 18 to move in a second direction toward a second position. FIGS. 3b, 5a, and 5b show the threaded member 18 moved toward its first position while FIGS. 3a, 6a, and 6b show the threaded member moved toward its second position. It should be noted that in FIGS. 3a, 3b, 4, 5a, 5b, 6a, and 6b the outer sleeve 24 has been removed to show the inner components of the device.

Figure 4:
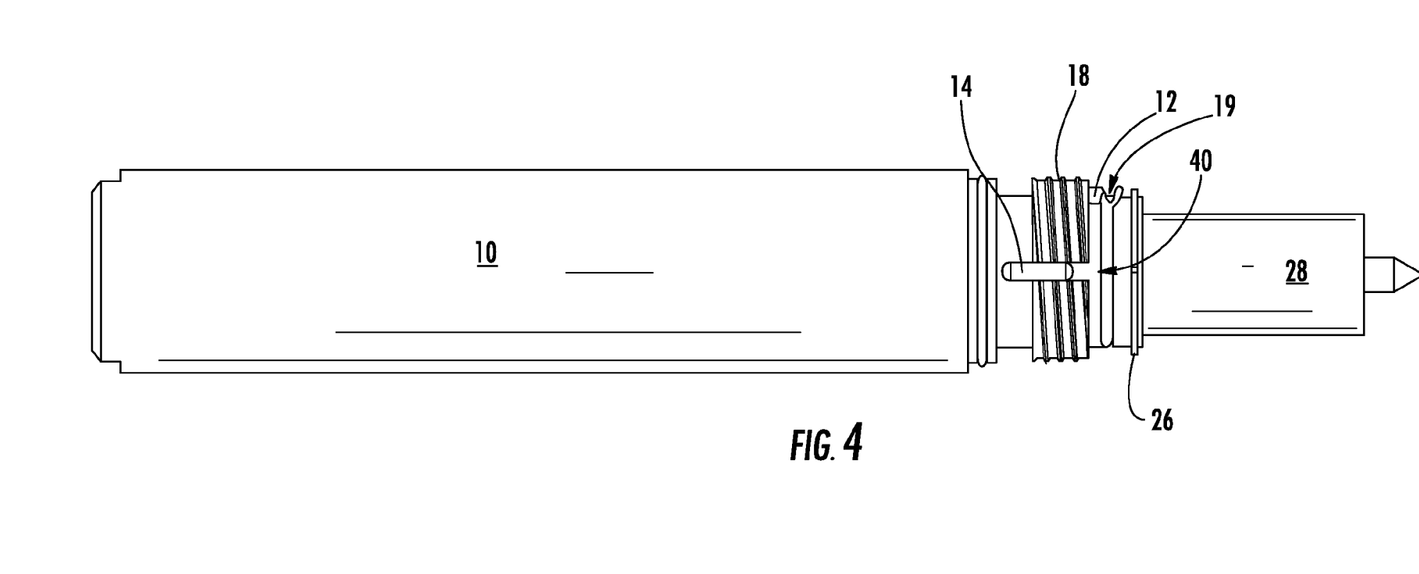
FIG. 4 is a side view showing the anti-rotation key wherein the outer sleeve has been removed for clarity.

As best seen in FIG. 4, an anti-rotation key 14 may be combined with the arbor 10 to prevent the threaded member 18 from rotating as the outer sleeve 24 is rotated. In other words, the anti-rotation key 14 prevents the threaded member 18 from spinning with the outer sleeve 24 as the outer sleeve 24 is rotated. As shown in FIG. 4, the anti-rotation key 14 fits in an elongated groove 40 or opening in the threaded member 18 allowing the threaded member 18 to move linearly in the direction of the groove 40, but not allowing the threaded member 18 to move perpendicularly (rotate) to the direction of the groove 40.

Figure 7:
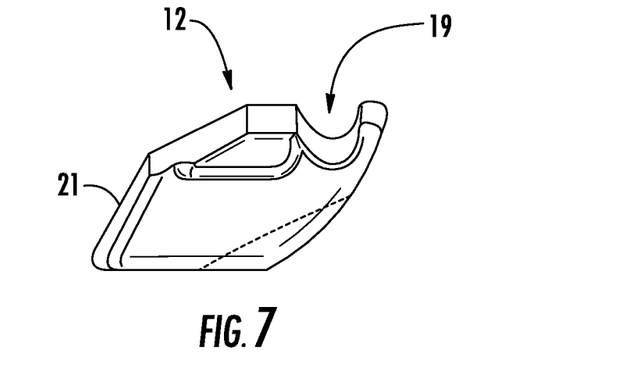
FIG. 7 is a side view of an embodiment of a drive key.

As is known in the art, many tools 28 used with power drivers 11 have shafts that preferably comprise at least one flat portion referred to herein as a drive flat 27. (It should be noted, however, that the present invention may be used with tools 28 that do not have drive flats 27.) An illustrative tool 28 having at least one drive flat surface 27 is shown in FIG. 2. The drive flat 27 provides a surface against which torque can be applied to secure the tool 28 with the arbor 10. In the present invention, torque is applied to the drive flat 27 using a drive key 12. The drive key 12 is pivotally combined with the arbor 10. The pivotal motion of the drive key 12 can be seen by comparing FIG. 5b with FIG. 6b. The drive key 12 has a first position wherein the drive key 12 is retracted and a second position wherein the drive key 12 is extended to contact the drive flat 27 of the tool 28. FIGS. 3b and 5b show the drive key 12 in its first position while FIGS. 3a and 6b show the drive key 12 in its second position. As seen in FIG. 5b, in some embodiments a spring or elastic member 22 biases the drive key 12 in its first (retracted) position. Elastic member 22 is preferably a ring comprised of a rubber or elastic material. FIG. 7 shows an embodiment of a drive key 12 having a groove 19 that is adapted to receive the elastic member 22.

To combine the tool 28 with the arbor 10, the shaft of the tool 28 is inserted into the opening in the arbor 10 second end. The outer sleeve 24 is rotated to move the threaded member 18 from its first position (FIGS. 3b, 5a, and 5b) to its second position (FIGS. 3a, 6a, and 6b). As the threaded member 18 moves, it contacts the drive key 12 and pivots it from its first position (FIGS. 5a and 5b) to its second position (FIG. 6a and 6b). In the embodiment shown in FIG. 7, the drive key 12 has a tapered face 21. FIGS. 5b and 6b, show how the drive key's 12 tapered face 21 engages the tapered face 23 of the threaded member 18 causing the drive key 12 to pivot toward its second position. The opposing tapered faces 21, 23 help the threaded member 18 to smoothly engage the drive key 12 as it moves the drive key 12 to its second position. The outer sleeve 24 is rotated until the drive key 12 is firmly engaged with the tool's 28 drive flat(s) 27 so that the tool 28 is securely fastened with the arbor 10. The device is capable of being used with tools 28 having different drive flat 27 depths because tools 28 with deeper flats 27 simply require the outer sleeve 24 to be rotated further in its first direction while tools 28 with shallower flats 27 require less rotation of the outer sleeve 24.

To release the tool 28 from the arbor 10, the outer sleeve 24 is rotated in its second direction which causes the threaded member 18 to move in its second direction away from the drive key 12. With the threaded member 18 no longer in contact with the drive key 12, the drive key 12 is pivoted away from the tool 28 by the elastic member 22, which, as described above, biases the drive key 12 toward its first position.

Drive keys 12 may be added or removed from the arbor 10 to allow the device to be used with tools 28 having different numbers of drive flats 27. FIG. 2 shows an embodiment of the device having two drive keys 12 adapted to contact the two drive flat 27 surfaces of the tool 28. In an alternate embodiment (not shown), the invention may only comprise one drive key 12 to secure the tool 28 with the arbor 10. The drive keys 12 can be manually inserted or removed from the arbor 10 by disassembling the invention as shown in FIG. 2. The invention is able to accommodate varying numbers of drive keys 12 in part because the arbor 10 opening into which the tool 28 is inserted is a fixed size. Existing chuck devices require three gripping members because the gripping members are disposed 120 degrees apart to grasp the tool 28 along a central axis. In contrast, in the present invention the arbor 10 opening into which the tool 28 is inserted is a fixed size so that as the key 12 contacts the tool's 28 drive flat 27 surface, the tool 28 may be forced against the fixed interior portion of the arbor 10. The fixed size of the arbor 10 opening allows the invention to provide extremely accurate location of the tool 28 since as the drive keys 12 pivot toward the drive flat 27, the diameter of the opening into which tool 28 is inserted remains constant.

Another reason that the invention is able to be used with different numbers of drive keys 12 is because the drive keys 12 pivot independently. In other words, the pivotal movement of one drive key 12 is not dependent on the pivotal movement of the other drive keys 12. Of course, if one drive key 12 cannot be pivoted (extended) any further due to its contact with a tool 28, the threaded member 18 will become lodged against that drive key 12 and prevent further rotation of the outer sleeve 24.

Certain embodiments of the invention comprise features that help the device functions smoothly and efficiently. One such feature used in some embodiments is the o-ring 16 seen best in FIG. 2. The o-ring 16 is preferably placed between the outer sleeve 24 and the arbor 10 to allow the outer sleeve 24 to rotate smoothly against the arbor 10. The o-ring 16 also serves as a seal to keep dust and debris from being able to infiltrate the inner workings of the device. In addition to the o-ring 16, another feature used in some embodiments is the retaining ring 26 which is seen in FIGS. 2 and 4. Retaining ring 26 helps to ensure that the outer sleeve 24 and threaded member 18 do not become detached from the arbor 10 as they are moved laterally along the length of the arbor 10.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is as follows:

1. An arbor device having a first end adapted to be combined with a power driver and a second end having a receiving bore that is adapted to receive a tool having at least one engagement surface, the device comprising: a drive key pivotally combined with the arbor, the drive key having a first position and a second position, wherein the drive key has a first face and a second face, and wherein the second face is at an angle with respect to the engagement surface of the tool when the drive key is in the first position and the second face is engaged with the engaging surface when the tool is in the second position; an outer sleeve combined with the arbor second end, the outer sleeve having a threaded inner surface; a threaded member having a threaded outer surface in threaded engagement with the threaded inner surface of the outer sleeve and having a first face engageable with the first face of the drive key; wherein rotation of the outer sleeve in a first direction causes the threaded member to move in a first direction and rotation of the outer sleeve in a second direction causes the threaded member to move in a second direction; wherein the first face of the threaded member engages the first face of the drive key and moves the drive key into its second position to engage the engagement surface of the tool as the threaded member is moved in the second direction; wherein the receiving bore receives the tool axially beyond an operative location where the first face of the threaded member engages the first face of the drive key; and an anti-rotation key combined with the arbor second end and adapted to be received by the elongated opening in the threaded member to prevent the threaded member from rotating as the outer sleeve is rotated.

2. The arbor of claim 1 wherein the drive key is biased in its first position by an elastic member.

3. The arbor of claim 2 wherein the elastic member is an elastic ring.

4. The arbor of claim 2 wherein the drive key further comprises a groove adapted to receive the elastic member.

5. The arbor of claim 1 further comprising a retaining ring combined with the arbor second end to prevent the outer sleeve from becoming detached from the arbor.

6. The arbor of claim 1 wherein the threaded member comprises an elongated opening.

7. The arbor of claim 1 wherein one of the first face of the threaded member and the first face of the drive key is a tapered face for aiding an engagement between the threaded member and the drive key.

8. The arbor of claim 1 wherein more than one drive key is combined with the arbor.

9. The arbor of claim 1 wherein the receiving bore is a fixed diameter.

10. The arbor of claim 1 further comprising an o-ring combined with the arbor second end between the outer sleeve and the arbor, the o-ring for preventing debris from entering the arbor.

11. The arbor of claim 1 wherein a diameter of the tool, a diameter of the outer sleeve, and a diameter of the threaded member is no greater than a diameter of the arbor.

12. The arbor of claim 1 wherein the power driver is a magnetic base drill.

13. The arbor of claim 1 wherein the tool is an annular cutter.

14. An arbor device having a first end adapted to be combined with a power driver and a second end adapted to be combined with a tool having at least one engagement surface, the device comprising: a drive key pivotally combined with the arbor for securing the tool to the arbor, wherein the drive key has a first position and a second position, wherein the drive key has a first face and second face, and wherein the second face is at an angle with respect the engagement surface of the tool when the drive key is in the first position and the second face is engaged with the engagement surface when the tool is in the second position; a threaded member combined with the arbor second end adapted to move from a first position to a second position; wherein the threaded member engages the drive key and moves the drive key to its second position where the second face engages the engagement surface of the tool as the threaded member is moved to its second position; wherein the drive key is biased in the first position and is urged to the second position by the threaded member to combine the arbor with the tool; and an anti-rotation key combined with the arbor second end and adapted to be received by the elongated opening in the threaded member to prevent the threaded member from rotating as the outer sleeve is rotated.

15. A method for securing a tool to a power driver using an arbor having an opening at one end for receiving the tool, a drive key pivotally attached to the arbor, an outer sleeve having a threaded inner surface, and a threaded member in threaded engagement with the outer sleeve's inner surface, the method comprising: inserting a portion of the tool into the opening; rotating the outer sleeve thereby causing the threaded member to move linearly along a length of the arbor to engage the drive key and cause an engagement face of the drive key to pivot from being at an angle with respect to an engagement surface of the tool toward the engagement surface of the tool and engaged with the engagement surface of the tool to secure the tool with the arbor; keeping the opening at a fixed diameter as the engagement face of the drive key pivots between being at the angle with respect to the engagement surface of the tool and being engaged with the engagement surface of the tool; and using an anti-rotation key combined with the arbor second end and adapted to be received by the elongated opening in the threaded member to prevent the threaded member from rotating as the outer sleeve is rotated.

16. A keyless arbor for combining a power driver and a tool having at least one flat surface, the keyless arbor comprising: a main body having a first end adapted to be combined with the power driver and a second end adapted to be combined with the tool; at least one drive key pivotally combined with the main body, wherein the drive key has an engagement face to selectively combine the tool with main body; a sleeve combined with the arbor and engaging the at least one drive key to pivot the engagement face of the drive key between a first position engaged with the flat surface of the tool and a second position at an angle with respect to the flat surface of the tool; wherein the second end of the main body of the arbor comprises an opening having a fixed diameter adapted to receive the tool, wherein the opening remains fixed as the engagement face of the drive key pivots between the first position and the second position; wherein the threaded member comprises an elongated opening; and an anti-rotation key combined with the arbor second end and adapted to be received by the elongated opening in the threaded member to prevent the threaded member from rotating as the sleeve is rotated.

17. The keyless arbor of claim 16, wherein the sleeve has a threaded inner surface, and further comprising a threaded member having a threaded outer surface in threaded engagement with the threaded inner surface of the sleeve, wherein rotation of the sleeve in a first direction causes the threaded member to move in a first direction and rotation of the sleeve in a second direction causes the threaded member to move in a second direction.

18. The keyless arbor of claim 17, wherein the threaded member engages the drive key and moves the drive key into engagement with the tool as the threaded member is moved in its second direction.

19. An arbor device having a first end adapted to be combined with a power driver and a second end adapted to be combined with a tool having at least one flat surface, the device comprising: 7 a drive key pivotally combined with the arbor, the drive key having a first position and a second position, wherein the drive key has a tapered face and an engagement face, and wherein the engagement face is at an angle with respect to the flat surface of the tool when the drive key is in the first position and the engagement face is engaged with the flat surface when the tool is in the second position; an outer sleeve combined with the arbor second end, the outer sleeve having a threaded inner surface; a threaded member having a threaded outer surface in threaded engagement with the threaded inner surface of the outer sleeve and having a surface engageable with the tapered face of the drive key; wherein rotation of the outer sleeve in a first direction causes the threaded member to move in a first direction and rotation of the outer sleeve in a second direction causes the threaded member to move in a second direction; wherein the threaded member engages the drive key and moves the drive key into its second position to engage the flat surface of the tool as the threaded member is moved in its second direction; wherein the drive key is biased in its first position by an elastic ring; wherein the threaded member comprises an elongated opening; and an anti-rotation key combined with the arbor second end and adapted to be received by the elongated opening in the threaded member to prevent the threaded member from rotating as the outer sleeve is rotated.

20. The arbor of claim 19, further comprising a retaining ring combined with the arbor second end to prevent the outer sleeve from becoming detached from the arbor.

21. The arbor of claim 19, wherein the second end of the arbor further comprises: a ring at the end of the arbor; at least two legs with a slot therebetween that combine the ring to the arbor, wherein the drive key is positioned in the slot for pivoting movement therein, and wherein when the tool is combined with the second end of the arbor the at least one flat surface of the tool is positioned proximate to the slot.

22. An arbor device having a first end adapted to be combined with a power river and a second end adapted to be combined with a tool having at least one flat surface, the device comprising: a drive key pivotally combined with the arbor, the drive key having a first position and a second position, wherein the drive key has a tapered face and an engagement face, and wherein the engagement face is at an angle with respect to the flat surface of the tool when the drive key is in the first position and the engagement face is engaged with the flat surface when the tool is in the second position; an outer sleeve combined with the arbor second end, the outer sleeve having a threaded inner surface; a threaded member having a threaded outer surface in threaded engagement with the threaded inner surface of the outer sleeve and having a surface engageable with the tapered face of the drive key; wherein rotation of the outer sleeve in a first direction causes the threaded member to move in a first direction and rotation of the outer sleeve in a second direction causes the threaded member to move in a second direction; wherein the threaded member engages the drive key and moves the drive key into its second position to engage the flat surface of the tool as the threaded member is moved in its second direction; a retaining ring combined with the arbor second end to prevent the outer sleeve from becoming detached from the arbor; wherein the threaded member comprises an elongated opening; and an anti-rotation key combined with the arbor second end and adapted to be received by the elongated opening in the threaded member to prevent the threaded member from rotating as the outer sleeve is rotated.

23. The arbor of claim 22 wherein the drive key is biased in its first position by an elastic ring.

24. The arbor of claim 22, wherein the second end of the arbor further comprises: a ring at the end of the arbor; at least two legs with a slot therebetween that combine the ring to the arbor, wherein the drive key is positioned in the slot for pivoting movement therein, and wherein when the tool is combined with the second end of the arbor the at least one flat surface of the tool is positioned proximate to the slot.

25. An arbor device having a first end adapted to be combined with a power driver and a second end adapted to be combined with a tool having at least one flat surface, the device comprising:
   a drive key pivotally combined with the arbor, the drive key having a first position and a second position, wherein the drive key has a tapered face and an engagement face, and wherein the engagement face is at an angle with respect to the flat surface of the tool when the drive key is in the first position and the engagement face is engaged with the flat surface when the tool is in the second position;
   an outer sleeve combined with the arbor second end, the outer sleeve having a threaded inner surface;
   a threaded member having a threaded outer surface in threaded engagement with the threaded inner surface of the outer sleeve and having a surface engageable with the tapered face of the drive key;
   wherein rotation of the outer sleeve in a first direction causes the threaded member to move in a first direction and rotation of the outer sleeve in a second direction causes the threaded member to move in a second direction;
   wherein the threaded member engages the drive key and moves the drive key into its second position to engage the flat surface of the tool as the threaded member is moved in its second direction;
   wherein the threaded member comprises an elongated opening; and
   an anti-rotation key combined with the arbor second end and adapted to be received by the elongated opening in the threaded member to prevent the threaded member from rotating as the outer sleeve is rotated.

26. The arbor of claim 25 wherein the drive key is biased in its first position by an elastic ring.

27. The arbor of claim 26 further comprising a retaining ring combined with the arbor second end to prevent the outer sleeve from becoming detached from the arbor.

28. The arbor of claim 27, wherein the second end of the arbor further comprises:

a ring at the end of the arbor;

at least two legs with a slot therebetween that combine the ring to the arbor, wherein the drive key is positioned in the slot for pivoting movement therein, and wherein when the tool is combined with the second end of the arbor the at least one flat surface of the tool is positioned proximate to the slot.

29. An arbor device having a first end adapted to be combined with a power driver and a second end adapted to be combined with a tool having at least one flat surface, the device comprising: a drive key pivotally combined with the arbor, the drive key having a first position and a second position, wherein the drive key has a tapered face and an engagement face, and wherein the engagement face is at an angle with respect to the flat surface of the tool when the drive key is in the first position and the engagement face is engaged with the flat surface when the tool is in the second position; an outer sleeve combined with the arbor second end, the outer sleeve having a threaded inner surface; a threaded member having a threaded outer surface in threaded engagement with the threaded inner surface of the outer sleeve and having a tapered face engageable with the tapered face of the drive key; wherein rotation of the outer sleeve in a first direction causes the threaded member to move in a first direction and rotation of the outer sleeve in a second direction causes the threaded member to move in a second direction; wherein the tapered face of the threaded member engages the tapered face of the drive key and moves the drive key into its second position to engage the flat surface of the tool as the threaded member is moved in the second direction; and an o-ring combined with the arbor second end between the outer sleeve and the arbor, the o-ring for preventing debris from entering the device wherein the threaded member comprises an elongated opening; and an anti-rotation key combined with the arbor second end and adapted to be received by the elongated opening in the threaded member to prevent the threaded member from rotating as the outer sleeve is rotated.

30. The arbor of claim 29 wherein the drive key is biased in its first position by an elastic ring.

31. The arbor of claim 30 wherein the drive key further comprises a groove adapted to receive the elastic ring.

32. The arbor of claim 31 further comprising a retaining ring combined with the arbor second end to prevent the outer sleeve from becoming detached from the arbor.

33. The arbor of claim 29, wherein the second end of the arbor further comprises: a ring at the end of the arbor; at least two legs with a slot therebetween that combine the ring to the arbor, wherein the drive key is positioned in the slot for pivoting movement therein, and wherein when the tool is combined with the second end of the arbor the at least one flat surface of the tool is positioned proximate to the slot.

* * * * *